United States Patent
Bahety

(10) Patent No.: US 10,949,913 B2
(45) Date of Patent: Mar. 16, 2021

(54) GENERATING REPLACEMENT QUERIES FOR ALTERNATE LISTINGS WITH DESIRED ITEM ATTRIBUTES

(71) Applicant: eBay Inc., San Jose, CA (US)

(72) Inventor: Vipul Bahety, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 222 days.

(21) Appl. No.: 15/987,524

(22) Filed: May 23, 2018

(65) Prior Publication Data
US 2019/0362415 A1    Nov. 28, 2019

(51) Int. Cl.
*G06Q 30/00* (2012.01)
*G06Q 30/06* (2012.01)
*G06F 16/9535* (2019.01)

(52) U.S. Cl.
CPC ..... *G06Q 30/0643* (2013.01); *G06F 16/9535* (2019.01); *G06Q 30/0633* (2013.01)

(58) Field of Classification Search
None
See application file for complete search history.

(56) References Cited

U.S. PATENT DOCUMENTS

| | | | |
|---|---|---|---|
| 6,356,878 B1 | 3/2002 | Walker et al. | |
| 7,174,308 B2 * | 2/2007 | Bergman | G06Q 20/04 705/27.1 |
| 7,330,826 B1 | 2/2008 | Porat et al. | |
| 7,461,022 B1 | 12/2008 | Churchill et al. | |
| 8,352,325 B2 | 1/2013 | Garg et al. | |
| 2001/0056395 A1 | 12/2001 | Khan | |
| 2002/0046157 A1 | 4/2002 | Solomon | |
| 2005/0125330 A1 | 6/2005 | Dinwoodie | |
| 2006/0143109 A1 | 6/2006 | Goel | |
| 2006/0167756 A1 | 7/2006 | Vonbergen et al. | |
| 2007/0288350 A1 | 12/2007 | Bykowsky | |
| 2012/0054012 A1 | 3/2012 | Mesaros | |
| 2014/0358725 A1 | 12/2014 | Afaq et al. | |

(Continued)

FOREIGN PATENT DOCUMENTS

WO    2019/226636 A1    11/2019

OTHER PUBLICATIONS

International Search Report received for PCT Application No. PCT/US2019/033290, dated Jul. 24, 2019, 4 pages.

(Continued)

*Primary Examiner* — Naeem U Haq
(74) *Attorney, Agent, or Firm* — Schwegman Lundberg & Woessner, P.A.

(57) ABSTRACT

A server receives an initial query that identifies a first item listed by a first user account and an initial query value for the first item. The server provides the initial query to a first computing device associated with the first user account and receives a first response to the initial query from the first computing device. The first response indicates a rejection of the initial query value. In response to the rejection, the server identifies a second item listed by a second user account. The second item includes a shared attribute with the first item. The server substitutes the initial query with a replacement query that identifies the second item and the initial query value for the first item. The replacement query is provided to a second computing device associated with the second user account.

16 Claims, 11 Drawing Sheets

(56) References Cited

U.S. PATENT DOCUMENTS

2014/0379394 A1   12/2014  Walker et al.
2015/0106229 A1    4/2015  Lyman
2015/0134486 A1*  5/2015  Samuga et al. .... G06Q 30/0605
                                                             705/26.41

OTHER PUBLICATIONS

International Written Opinion received for PCT Application No. PCT/US2019/033290, dated Jul. 24, 2019, 8 pages.
International Preliminary Report on Patentability Received for Application No. PCT/US2019/033290, dated Dec. 3, 2020, 10 pages.

* cited by examiner

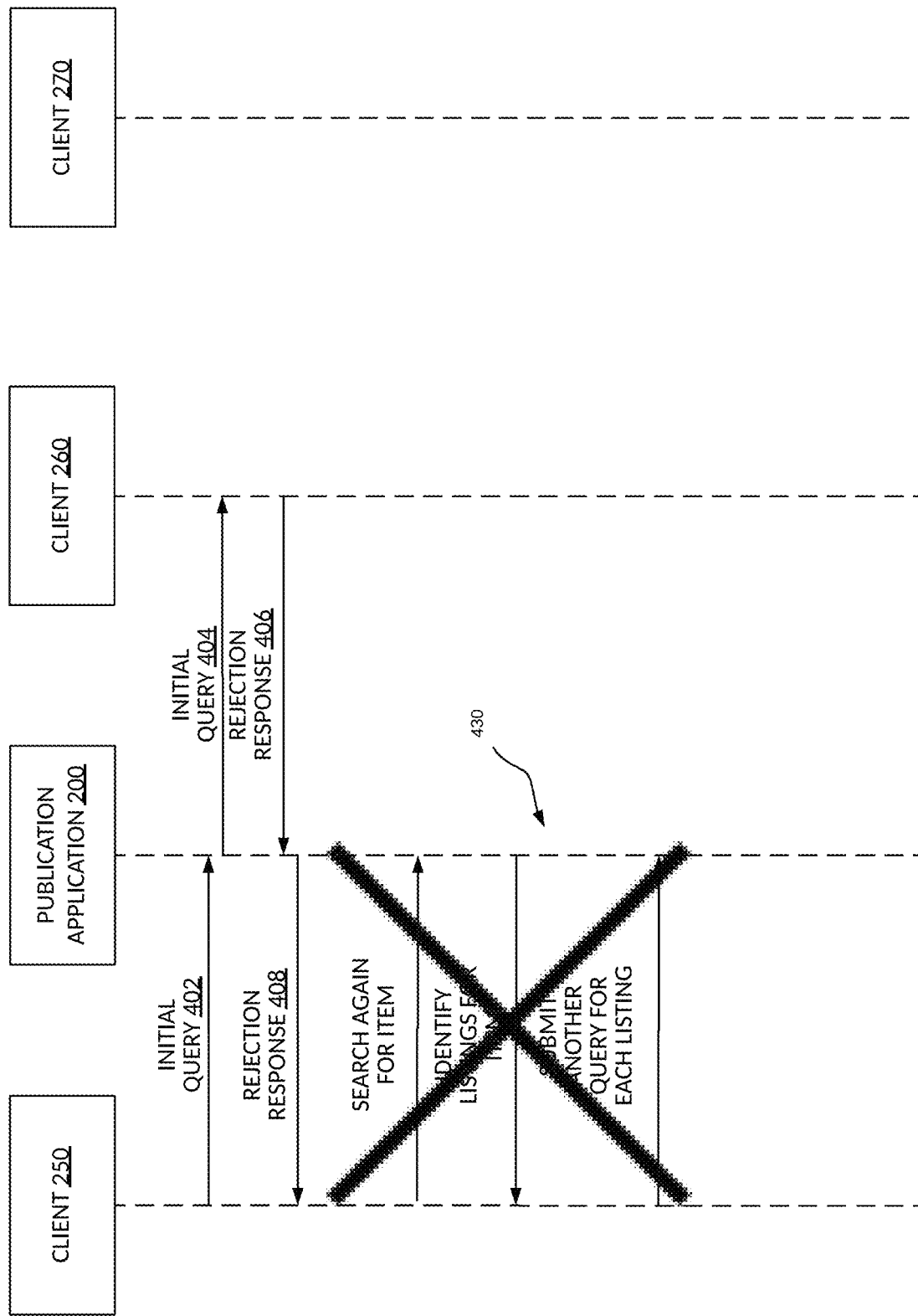

GENERATING REPLACEMENT QUERIES FOR ALTERNATE LISTINGS WITH DESIRED ITEM ATTRIBUTES

TECHNICAL FIELD

Embodiments of the present disclosure relate generally to a data system. More particularly, the present disclosure relates to identifying alternate listings and generating replacement queries for the alternate listings.

BACKGROUND

Online marketplace applications enable buyers and sellers to connect online. In one format, a buyer submits an offer (also referred to as a "best offer") to a seller for an item listed by the seller. The seller may collect offers from potential buyers and select one offer to accept. Therefore, the offers from the multiple potential buyers are most often declined. These buyers may become discouraged by their declined offers and abandon their pursuit of the item. In other cases, some buyers will have to manually perform another search for the item again and repeat the same process by submitting another offer with other sellers of the item.

The present disclosure seeks to address these problems by providing improved technology and technical benefits.

BRIEF DESCRIPTION OF THE DRAWINGS

Various ones of the appended drawings merely illustrate example embodiments of the present disclosure and cannot be considered as limiting its scope.

FIG. 4B is a block diagram illustrating an example embodiment of interaction between components of a client-server system.

Figure 1:
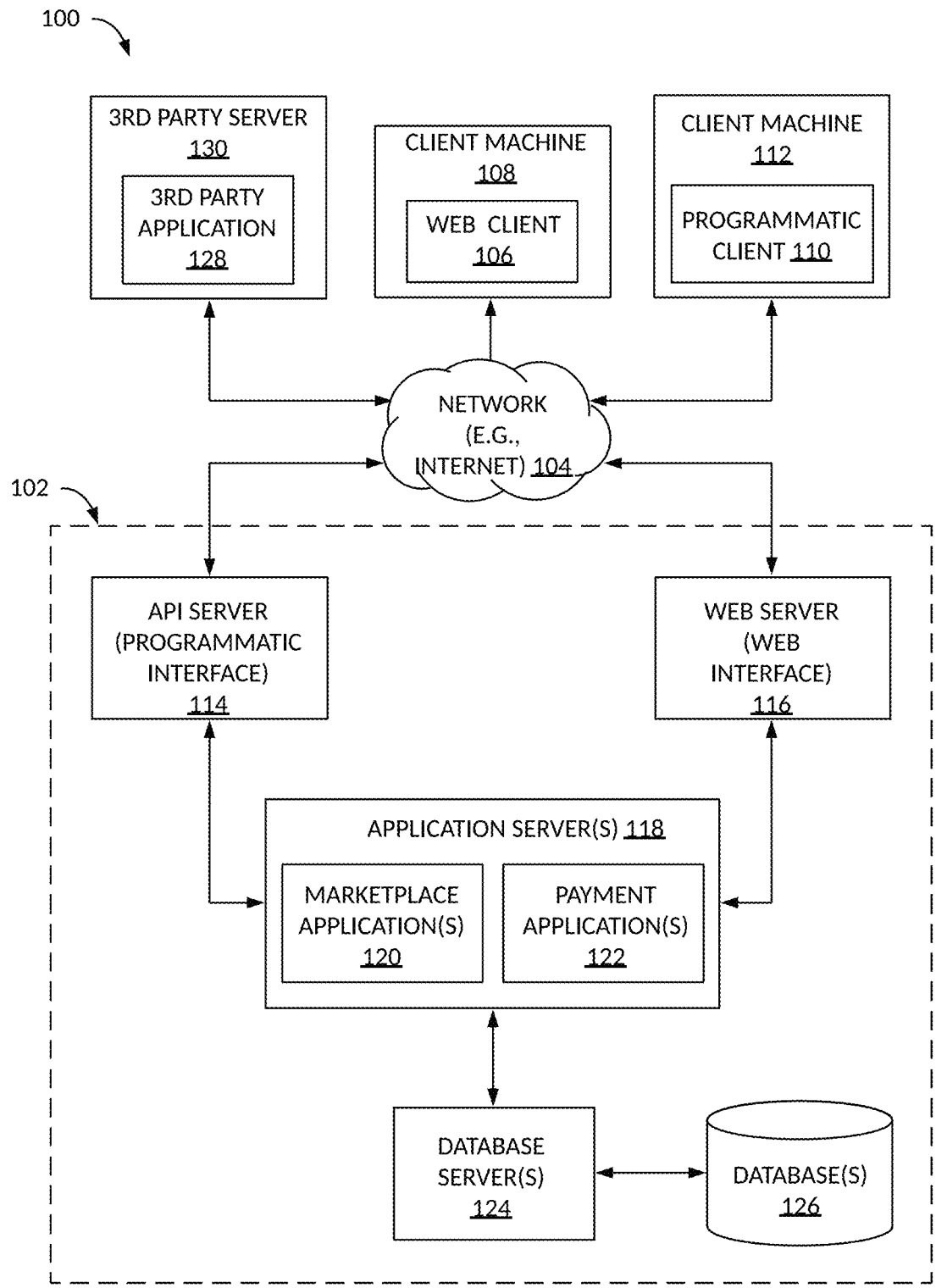
FIG. 1 is a network diagram depicting a client-server system, within which one example embodiment may be deployed.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter.

Example methods (e.g., algorithms) and systems (e.g., special-purpose machines) that detect a rejection of a query, identify other listings stored in a storage system, and generate a replacement query to the user accounts of the other listings are described. In one example application, a computing device of a buyer submits an initial query (e.g., an offer) to a computing device of a seller for an item listed in an online marketplace application. If the seller declines the offer, the buyer will have to move on and search for other listings or sellers and again submit other offers. The subsequent searches or queries can be avoided by the online marketplace application by automatically surfacing an offer to other sellers who are selling the same item once the original offer to the seller has been declined. For example, the online marketplace application provides an option to the buyer to generate replacement queries to other sellers should the first seller decline. The online marketplace application takes into account the attributes of the originally sought item (e.g., product, condition, shipping type, price) and identifies other sellers who are selling the same or similar item. The online marketplace application also uses signals such as seller's reputation ranking, seller's past sales history for the item, propensity to accept best offers, and possibility of accepting the offer to identify the sellers to whom the offer should be sent. Once the sellers are identified, the online marketplace application sends a notification to a limited number of top sellers and inform them that a buyer has made an offer for the item they are selling. The limited number of top sellers will have a limited amount of time (e.g., 24-48 hours) to accept and respond to the replacement offer. Once a seller accepts the offer, the buyer will be informed that an offer has been accepted. The buyer can further review details of the seller and the item before accepting the offer.

As a result, one or more of the methodologies described herein facilitate solving the technical problem of generating multiple subsequent user interfaces to provide a computing device with other search queries for other user accounts related to an item in response to the computing device receiving a rejection of an initial query. The computing device would have to manually search and identify other users accounts and navigate through multiple user interfaces to resubmit the queries. As such, one or more of the methodologies described herein may obviate a need for certain efforts or computing resources that otherwise would be involved in generating false positives of malware detection in the files. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

In various example embodiments, a server receives an initial query that identifies a first item listed by a first user account and an initial query value for the first item. The server provides the initial query to a first computing device associated with the first user account and receives a first response to the initial query from the first computing device. The first response indicates a rejection of the initial query value. In response to the rejection, the server identifies a second item listed by a second user account. The second item includes a shared attribute with the first item. The server substitutes the initial query with a replacement query that identifies the second item and the initial query value for the first item. The replacement query is provided to a second computing device associated with the second user account.

In one example embodiment, the server receives, from the second computing device, a second response from the second computing device. The second response indicates an acceptance of the initial query value. The server provides the second response to the first computing device and receives a confirmation of the second response from the first computing device.

In another example embodiment, the server identifies, in a listing application, a plurality of listings that indicate the first item as available. Each listing is originated by one or more user accounts of the listing application. The server provides the replacement query to the one or more user accounts that identify the first item as available in their corresponding listing. The replacement query identifies the first item and the initial query value for the first item.

In another example embodiment, the server identifies, in a listing application, a first plurality of listings that indicate the first item as available. Each listing is originated by one or more user accounts. The server then identifies a second plurality of listings from the first plurality of listings based on a replacement attribute. The server provides the replacement query to the one or more user accounts from the second plurality of listings. The replacement attribute includes one of a user account ranking and a geographic location.

In another example embodiment, the server provides an option for the replacement query to a querying computing device prior to receiving the initial query from the querying computing device. The initial query indicates a selection of the option for the replacement query.

In another example embodiment, the server generates a first graphical user interface (GUI) comprising a first graphical element representing the option for the replacement query. The first graphical user interface is provided to the querying computing device. The server generates a second GUI indicating a second response from the replacement query to a second computing device associated with the second user account, without generating another GUI to provide another query submission for the first item to the second computing device.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 110 executing on respective client machines 108 and 112.

An application programming interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 110 accesses the various services and functions provided by the marketplace and payment applications 120 and 122 via the programmatic interface provided by the API server 114. The programmatic client 110 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 110 and the networked system 102.

FIG. 1 also illustrates a third-party application 128 executing on a third-party server machine 130 as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
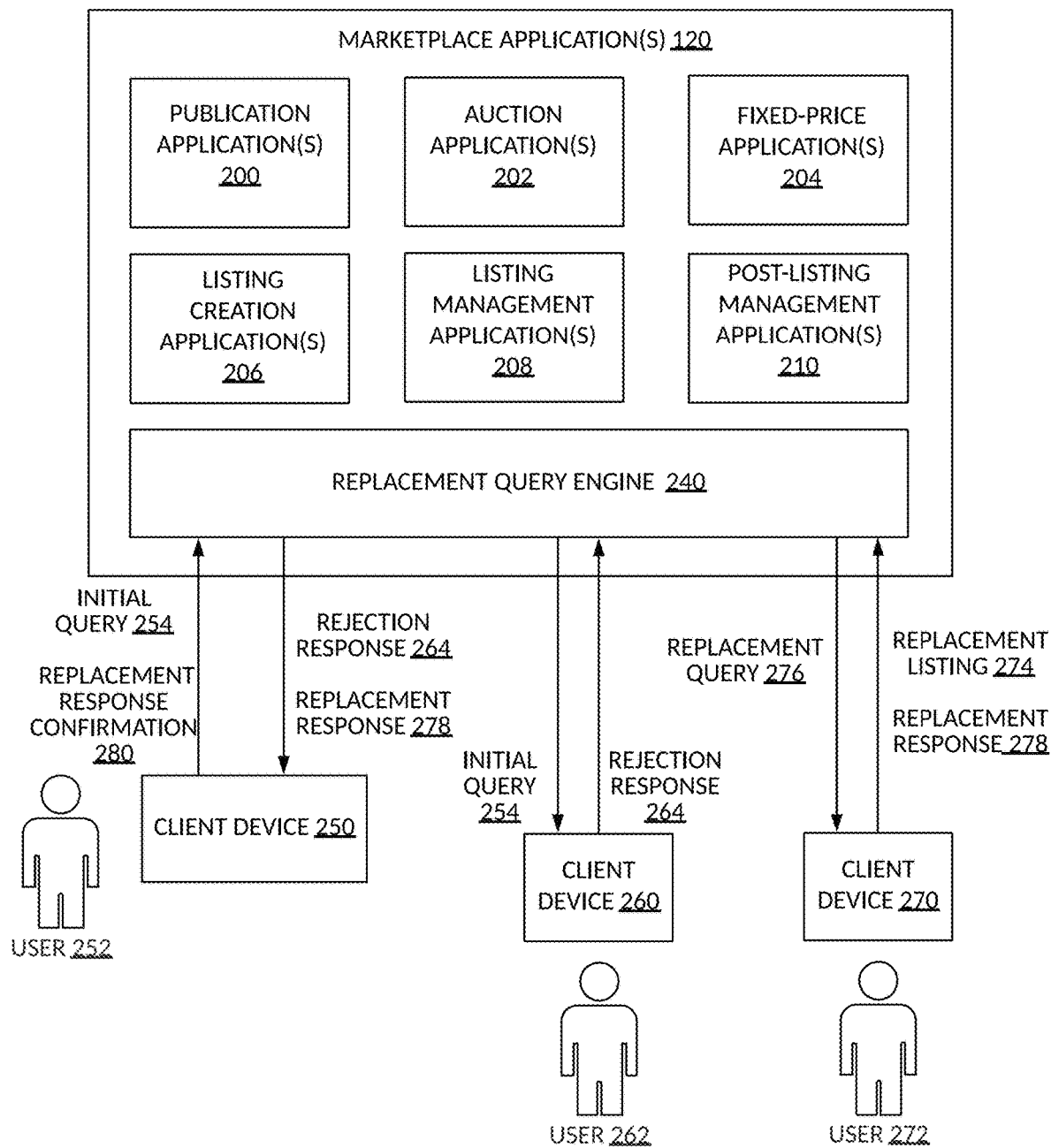
FIG. 2 is a block diagram illustrating marketplace applications that, in one example embodiment, are provided as part of a networked system.

FIG. 2 is a block diagram illustrating marketplace applications 120 that, in one example embodiment, are provided as part of the networked system 102. The marketplace applications 120 may be hosted on dedicated or shared server machines (not shown) that are communicatively coupled to enable communications between or among server machines. The marketplace applications 120 themselves are communicatively coupled (e.g., via appropriate interfaces) to each other and to various data sources, so as to allow information to be passed between or among the marketplace applications 120 or so as to allow the marketplace applications 120 to share and access common data. The marketplace applications 120 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than the starting price of the auction.

Listing creation applications 206 allow sellers to conveniently author listings pertaining to goods or services that they wish to transact via the networked system 102, and listing management applications 208 allow sellers to manage such listings. Specifically, where a particular seller has authored and/or published a large number of listings, the management of such listings may present a challenge. The listing management applications 208 provide a number of features (e.g., auto-relisting, inventory level monitors, etc.) to assist the seller in managing such listings. One or more post-listing management applications 210 also assist sellers with a number of activities that typically occur post-listing.

A replacement query engine 240 receives an initial query 254 from user 252 of a client device 250 operating an application configured to communicate with the marketplace application 120. The initial query 254 includes, for example, an offer for an item listed using the publication application 200 by user 262 of a client device 260. The initial query 254 indicates the item and an initial query value (e.g., best offer amount). The replacement query engine 240 communicates the initial query 254 to the client device 260. In the event that the user 262 rejects the initial query value (e.g., best offer amount), the client device 260 sends a rejection response 264 to the replacement query engine 240.

In one example embodiment, the replacement query engine 240 communicates the rejection response 264 and a replacement response 278 to the client device 250. The replacement response 278 identifies an acceptance of an offer for the same or similar item in the initial query 254 with the initial query value from the user 272 of the client device 270.

For example, when the replacement query engine 240 receives the rejection response 264 and detects the rejection of the initial query value in the initial query 254, the replacement query engine 240 identifies other user accounts with the item (from the initial query 254) available (e.g., replacement listing 274) and generates a replacement query 276 (that identifies the same item or a similar item) to the other user accounts (e.g., user account of user 272) selected based factors such as seller ranking and likelihood to accept the replacement query 276 based on historical transactions. The replacement query engine 240 receives a replacement response 278 that indicates that the user 272 has accepted the offer from the replacement query 276. The user 252 may confirm the transaction by having the client device 250 provide a replacement response confirmation 280 to the replacement query engine 240. In one example embodiment, the client devices 250, 260, and 270 communicate with the replacement query engine 240 via a web browser.

It should be noted that the term "web browser" as used in this disclosure shall be interpreted broadly to cover any application capable of displaying item attributes and rendering images from a web server. As such, this may include traditional web browsers as well as stand-alone applications (or apps) operating on mobile or other devices. For example, the web browser could be a traditional web browser such as Internet Explorer from Microsoft Corp., a stand-alone app such as a shopping application, a video player app, etc.

In another example where the web browser is a stand-alone app, it may be operating on, for example, a mobile device having a display and a camera. The techniques described herein could therefore be applied to an image obtained by the mobile device from an outside source, such as via the Internet, an image previously stored on the mobile device, or an image taken by the camera on the mobile device, potentially in real time. Indeed, the techniques described herein can be applied on any device that is capable of obtaining a digital image and transmitting portions of that digital image to another device. Mobile devices are certainly one example, but others are possible as well, such as wearables and head-mounted devices.

Embodiments where the camera is used in real time to capture images on which the techniques described in this document are applied may also be useful in a virtual reality or augmented reality device. For example, a camera in an augmented reality device may capture an image while simultaneously overlaying graphics or other images over the captured image. The techniques described herein can be applied to the captured image or the composite image formed by the combination of the captured image and the overlay(s).

Figure 3:
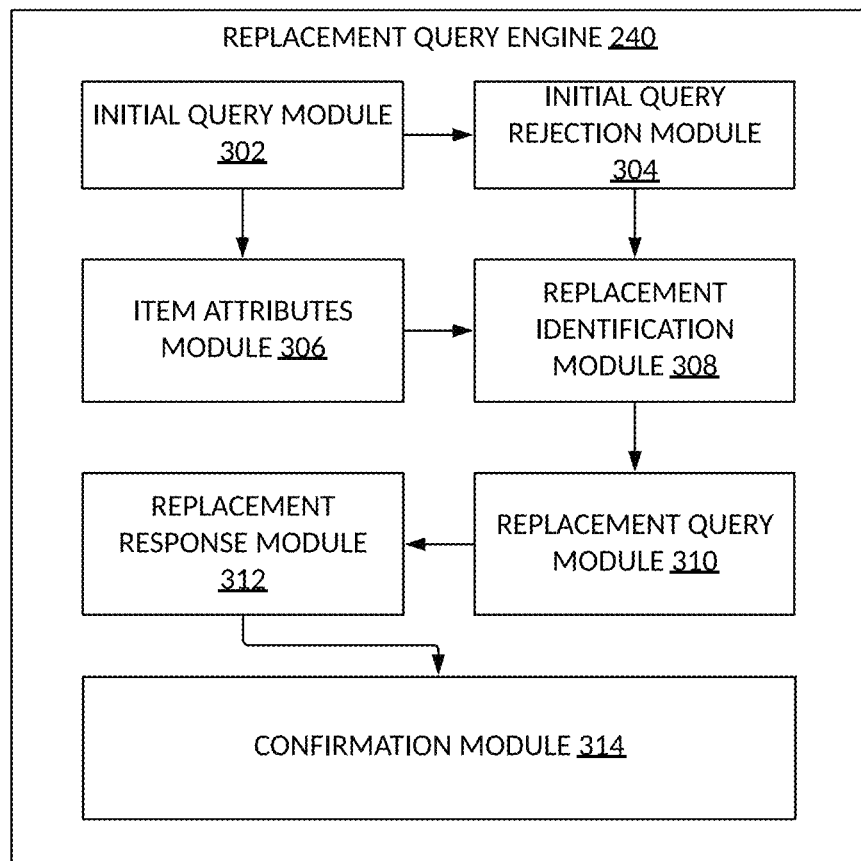
FIG. 3 is a block diagram illustrating an example embodiment of replacement query engine.

FIG. 3 is a block diagram illustrating an example embodiment of the replacement query engine 240. The replacement query engine 240 includes, for example, an initial query module 302, an initial query rejection module 304, an item attributes module 306, a replacement identification module 308, a replacement query module 310, a replacement response module 312, and a confirmation module 314. The initial query module 302 receives an initial query from the client 250. The initial query includes, for example, an offer for an item listed by the user 262. The initial query identifies a user account of the user 262 in the publication application 200, the item, and the initial query value (e.g., best offer value). The initial query module 302 forwards the initial query to the client device 260 of the user 262.

The initial query rejection module 304 detects a rejection response from the client device 260. The rejection response indicates that the user 262 of the client device 260 has rejected the initial query from the user 252. The initial query rejection module 304 notifies the replacement identification module 308 of the rejection from the user 262.

The item attributes module 306 identifies attributes related to the item identified in the initial query. For example, the item attributes module 306 identifies the brand and model of the item, the condition of the item, a color, a year of release of the item, and so forth. The item attributes module 306 provides the attributes to the replacement identification module 308.

The replacement identification module 308 detects that the initial query has been rejected based on the notification from the initial query rejection module 304. The replacement identification module 308 also accesses the attributes of the item from the item attributes module 306. When the replacement identification module 308 detects that the initial query has been rejected, the replacement identification module 308 identifies other item listings from the publication application 200 using the item attributes. For example, the replacement identification module 308 identifies another listing having the same item as the item in the initial query. In another example, the replacement identification module 308 identifies another listing have a similar item (e.g., different color, 6403 instead of 128 GB, 2017 model instead of 2018 model) as the item in the initial query.

In another example embodiment, the replacement identification module 308 identifies the user accounts of the other listings having the same or similar item to determine a seller attribute (e.g., seller rating, or a likelihood that the seller identified in the user account will accept a replacement offer). For example, the replacement identification module 308 analyzes an acceptance history of a seller and determines that the seller accepts 80% of offers with an amount within 10% of an asking value. Therefore, if the query value is within 10% of the asking value of the item listed by the seller, the replacement identification module 308 will flag and select that seller.

In another example embodiment, the replacement identification module 308 identifies sellers based on seller attributes and item attributes. For example, the replacement identification module 308 selects the top five sellers who have the item in stock and are most likely to accept the offer from the initial query. Once the sellers have been identified, the replacement identification module 308 sends the list of sellers to the replacement query module 310.

The replacement query module 310 generates a replacement query that substitutes the initial query. For example, the replacement query indicates the replacement item (e.g., same or similar item), indicates the query value from the initial query, and identifies the selected sellers provided by the replacement identification module 308. The replacement query module 310 sends the replacement query to the respective (selected) sellers. For example, the replacement query module 310 sends a first replacement query that identifies item A (same as item A from the initial query) and the initial query value (e.g., best offer amount) to a seller S1 and a second replacement query that identifies item B (similar to item A from the initial query) and the initial query value (e.g., best offer amount) to seller S2.

The replacement response module 312 receives a response from one of the selected sellers (within a predefined amount of time). If one of the responses includes an acceptance of the replacement offer, the replacement response module 312 provides the acceptance notification to the confirmation module 314. If one of the responses includes a rejection of the replacement offer, the replacement response module 312 provides the rejection notification to the replacement query module 310. The replacement query module 310 may generate another replacement offer for each rejection detected by the replacement response module 312, In one example embodiment, the time window for the selected sellers to reply remains the same after the replacement query module 310 generates other replacement offers for each rejection. In another example embodiment, the time window for a selected seller to reply may depend on when its corresponding replacement offer has been sent by the replacement query module 310. Therefore, a cascading window of time may roll out in response to subsequent rejections for each seller.

The confirmation module 314 generates a request for the user 252 to confirm and approve the acceptance of the replacement offer. For example, the confirmation module 314 generates an acceptance notification to the client device 250 of the user 252 and receives a confirmation of the acceptance notification from the client device 250. Once the client device 250 confirms the acceptance notification, the replacement query module 310 withdraws or invalidates the replacement offers to the other selected sellers.

Figure 4A:
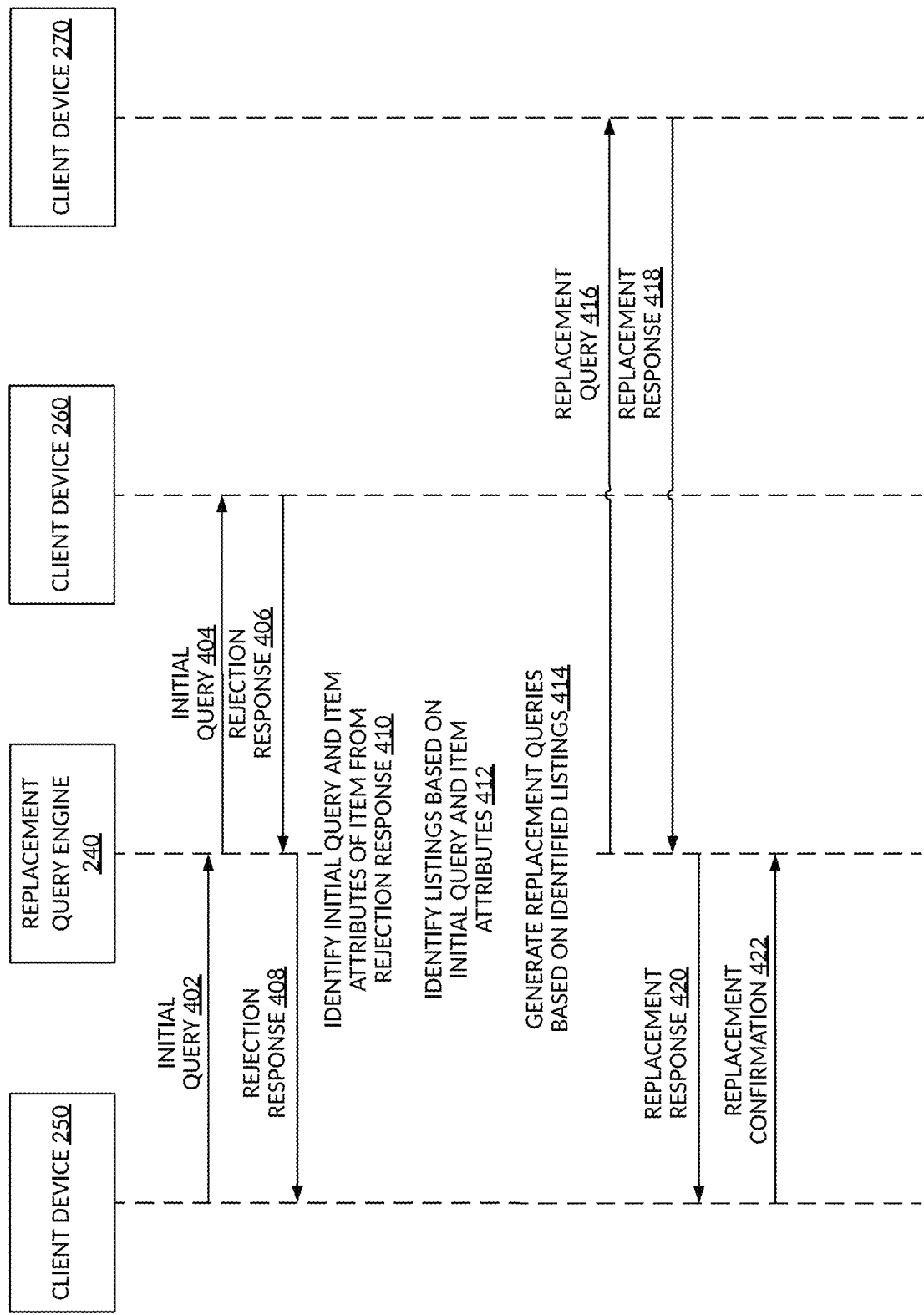
FIG. 4A is a block diagram illustrating an example embodiment of interaction between components of a client-server system.

FIG. 4A is a block diagram illustrating an example embodiment of interaction between components of a client-server system. At operation 402, the client device 250 sends an initial query (e.g., best offer for an item) to a replacement query engine 240. At operation 404, the replacement query engine 240 forwards the initial query to the client device 260. The client device 260 rejects the initial query and sends the rejection response at operation 406 back to the replacement query engine 240. The replacement query engine 240 communicates the rejection response to the client device 250 at operation 408. In another example embodiment, the replacement query engine 240 does not communicate the rejection response to the client device 250 and proceeds with a replacement query without intervention from the client device 250 subsequent to the initial query.

At operation 410, the replacement query engine 240 detects the rejection response and identifies the initial query and item attributes of the item from the rejection response (or from the initial query). At operation 412, the replacement query engine 240 identifies other listings based on the initial query and item attributes. At operation 414, the replacement query engine 240 generates replacement queries based on the identified listings from operation 412. For example, at operation 416, the replacement query engine 240 generates a replacement query (also referred to as a substitute or alternative offer) and sends the replacement query to the client device 270. At operation 418, the replacement query engine 240 receives a replacement response (e.g., acceptance or rejection of the replacement query). At operation 420, the replacement query engine 240 communicates the replacement response to the client device 250. At operation 422, the replacement query engine 240 receives a replacement confirmation (e.g., confirmation to proceed with the acceptance of the replacement query from client device 270).

FIG. 4B is a block diagram illustrating an example embodiment of interaction between components of a client-server system without the replacement query engine 240. At operation 402, the client device 250 sends an initial query (e.g., best offer for an item) to a publication application 200. At operation 404, the publication application 200 forwards the initial query to the client device 260. The client device 260 rejects the initial query and sends the rejection response back to the publication application 200 at operation 406. The publication application 200 communicates the rejection response to the client device 250 at operation 408. After receiving the rejection response, the client device 250 would manually have to submit another search for the item with the publication application 200, identify other listings with items similar to the item, and submit another query for each listing. These operations 430 can be avoided using the replacement query engine 240.

Figure 5:
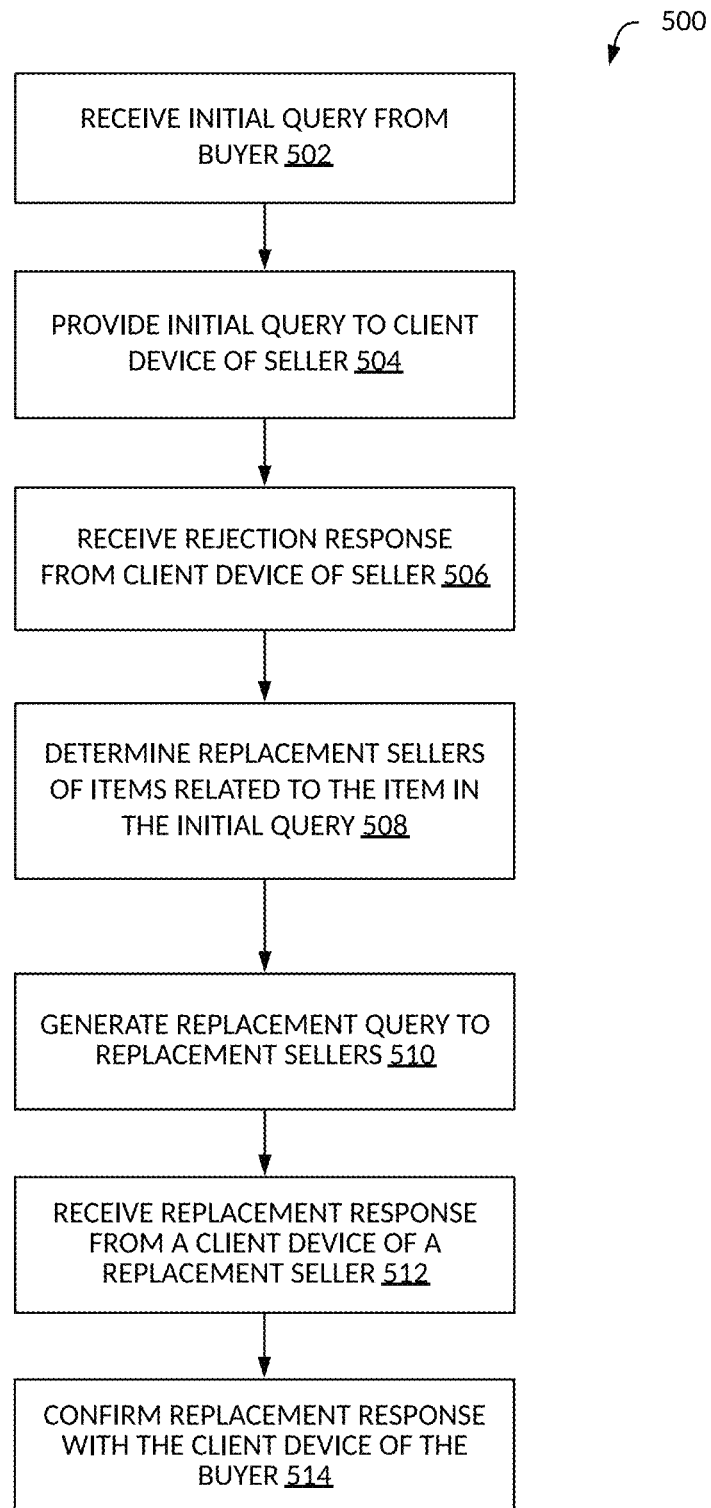
FIG. 5 is a flow diagram illustrating a method for operating a replacement query engine, in accordance with an example embodiment.

FIG. 5 is a flow diagram illustrating a method 500 for operating a replacement query engine, in accordance with an example embodiment. At operation 502, the replacement query engine 240 receives an initial query from the client device 250. At operation 504, the replacement query engine 240 provides the initial query to the client device 260 of user 262 (e.g., seller). At operation 506, the replacement query engine 240 receives a rejection response from the client device 260 of user 262. At operation 508, the replacement query engine 240 determines replacement sellers of items related to the item identified in the initial query. At operation 510, the replacement query engine 240 generates one or more replacement queries to replacement sellers (e.g., client device 270. At operation 512, the replacement query engine 240 receives a replacement response from a client device of a replacement seller (e.g., client device 270). At operation 514, the replacement query engine 240 confirms the replacement response with the client device 260.

Figure 6:
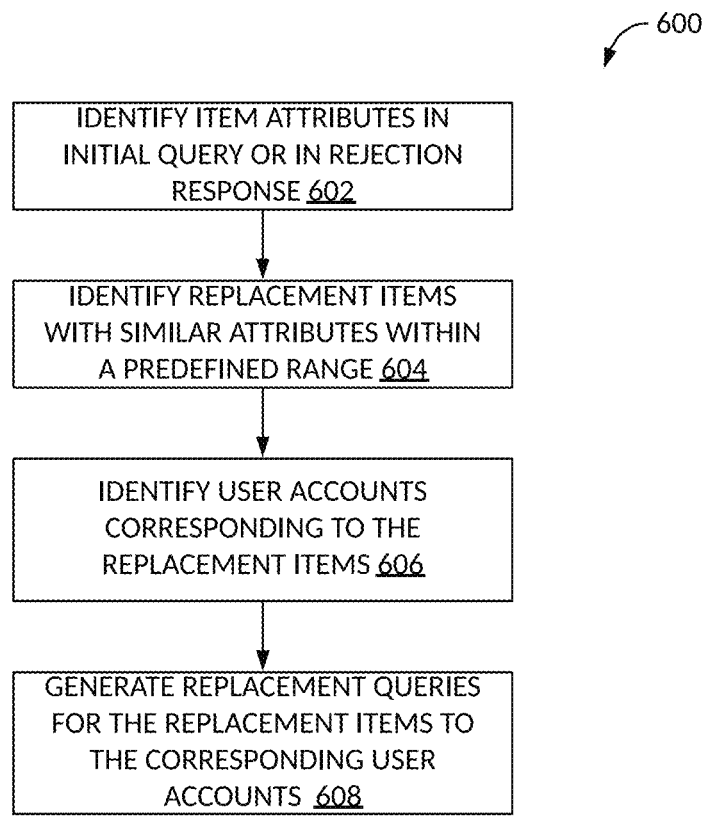
FIG. 6 is a flow diagram illustrating a method for operating a replacement query, in accordance with another example embodiment.
Figure 7:
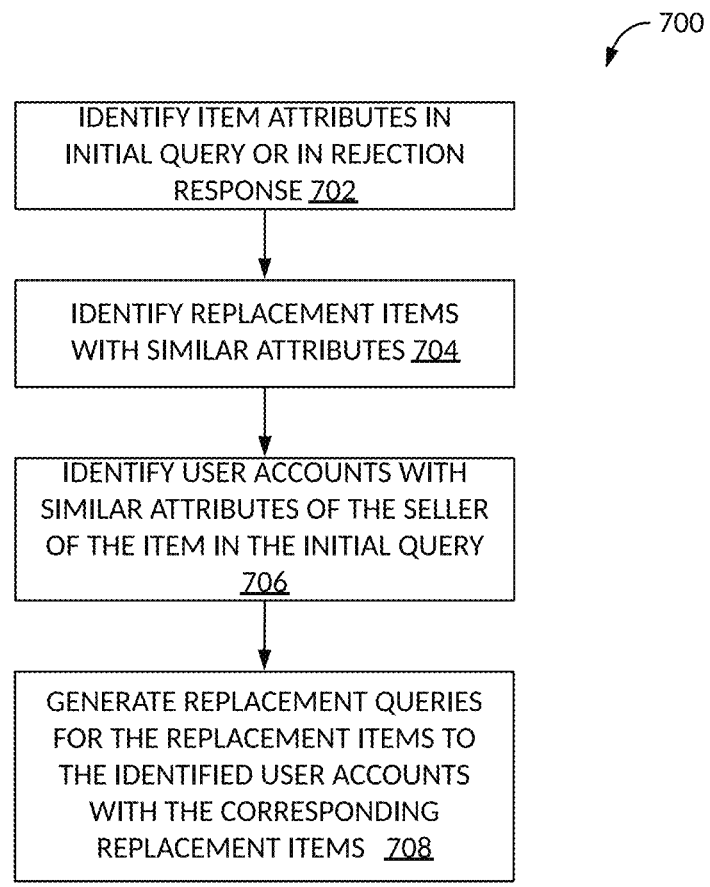
FIG. 7 is a flow diagram illustrating a method for operating a replacement query, in accordance with yet another example embodiment.

FIG. 6 is a flow diagram illustrating a method 600 for operating a replacement query, in accordance with another example embodiment. At operation 602, the item attributes module 306 identifies item attributes in the initial query or in the rejection response. At operation 604, the replacement identification module 308 identifies replacement items with similar attributes within a predefined range (e.g., new to factory refurbished condition). At operation 606, the replacement identification module 308 identifies user account of listings associated with the replacement items with similar attributes. At operation 608, the replacement query module 310 generates and sends replacement queries to the identified user accounts, FIG. 7 is a flow diagram illustrating a method 700 for operating a replacement query, in accordance with yet another example embodiment. At operation 702, the item attributes module 306 identifies item attributes in the initial query or in the rejection response. At operation 704, the replacement identification module 308 identifies replacement items with similar attributes (e.g., same geographic region of sellers). At operation 706, the replacement identification module 308 identifies user accounts with similar attributes (e.g., top seller, or relatively high reputation ranking) of the seller in the initial query, At operation 708, the replacement query module 310 generates and sends replacement queries to the identified user accounts with the corresponding replacement items.

Figure 8A:
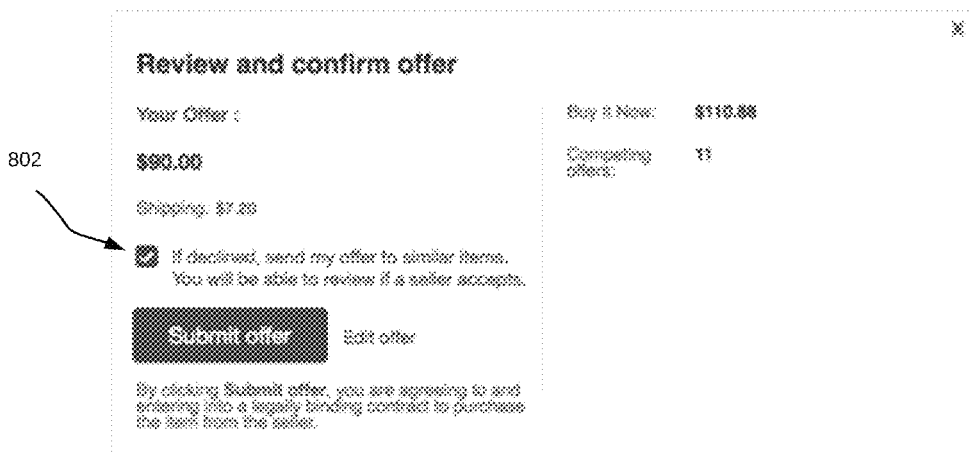
FIG. 8A is a block diagram illustrating an example screenshot of an initial query submission, in accordance with one example embodiment.
Figure 8B:
FIG. 8B is a block diagram illustrating an example screenshot of a rejection response, in accordance with one example embodiment.
Figure 8C:
FIG. 8C is a block diagram illustrating an example screenshot of a replacement query, in accordance with one example embodiment.

FIG. 8A is a block diagram illustrating an example screenshot 800 of a GUI of an initial query submission, in accordance with one example embodiment. A graphical user interface element 802 enables the user to bypass researching other listings, and resubmitting other queries if the offer in the screenshot 800 is rejected. FIG. 8B is a block diagram illustrating an example screenshot 804 of a rejection response, in accordance with one example embodiment. FIG. 8C is a block diagram illustrating an example screenshot 806 of a replacement query in accordance with one example embodiment.

Figure 9:
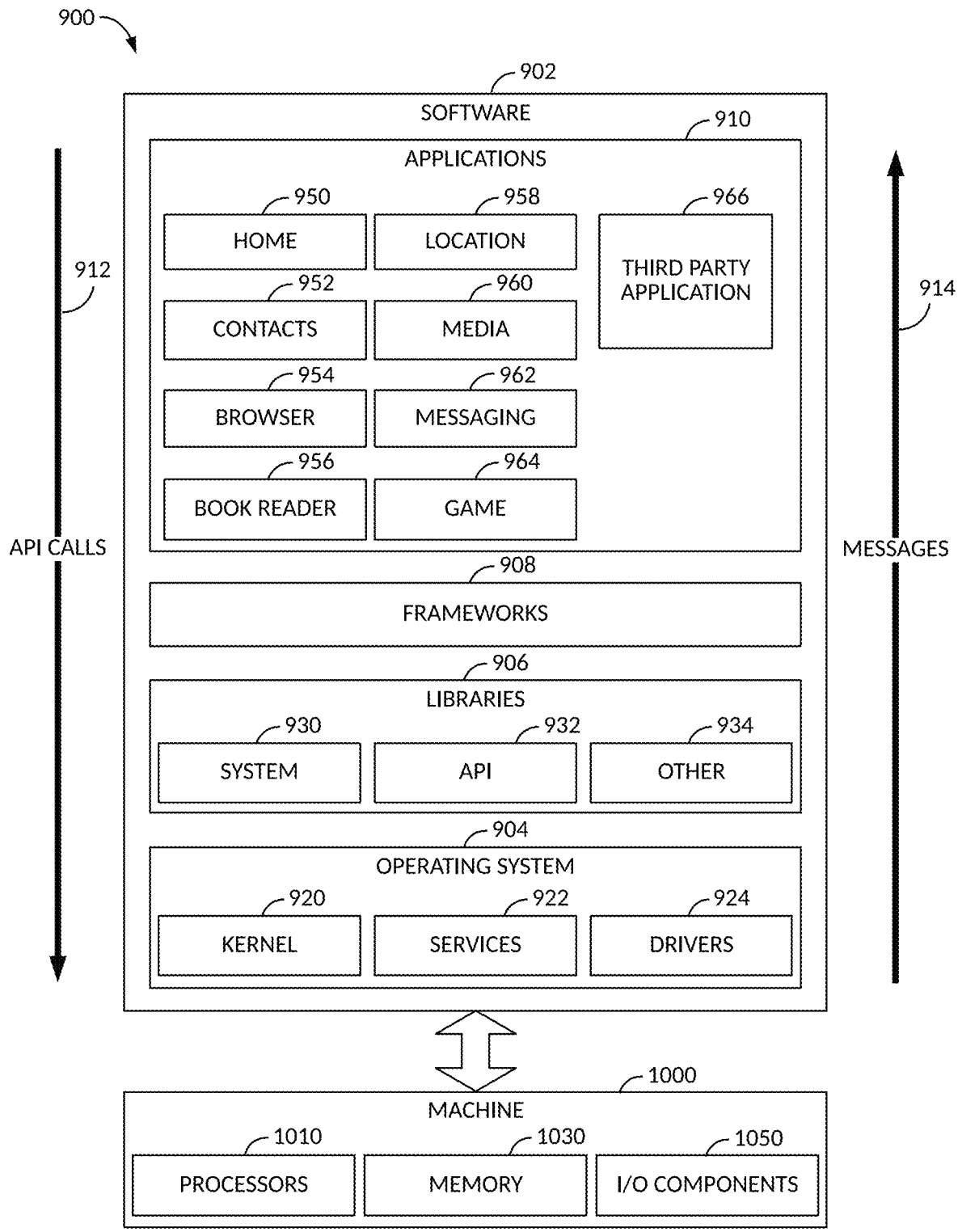
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various GUI functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
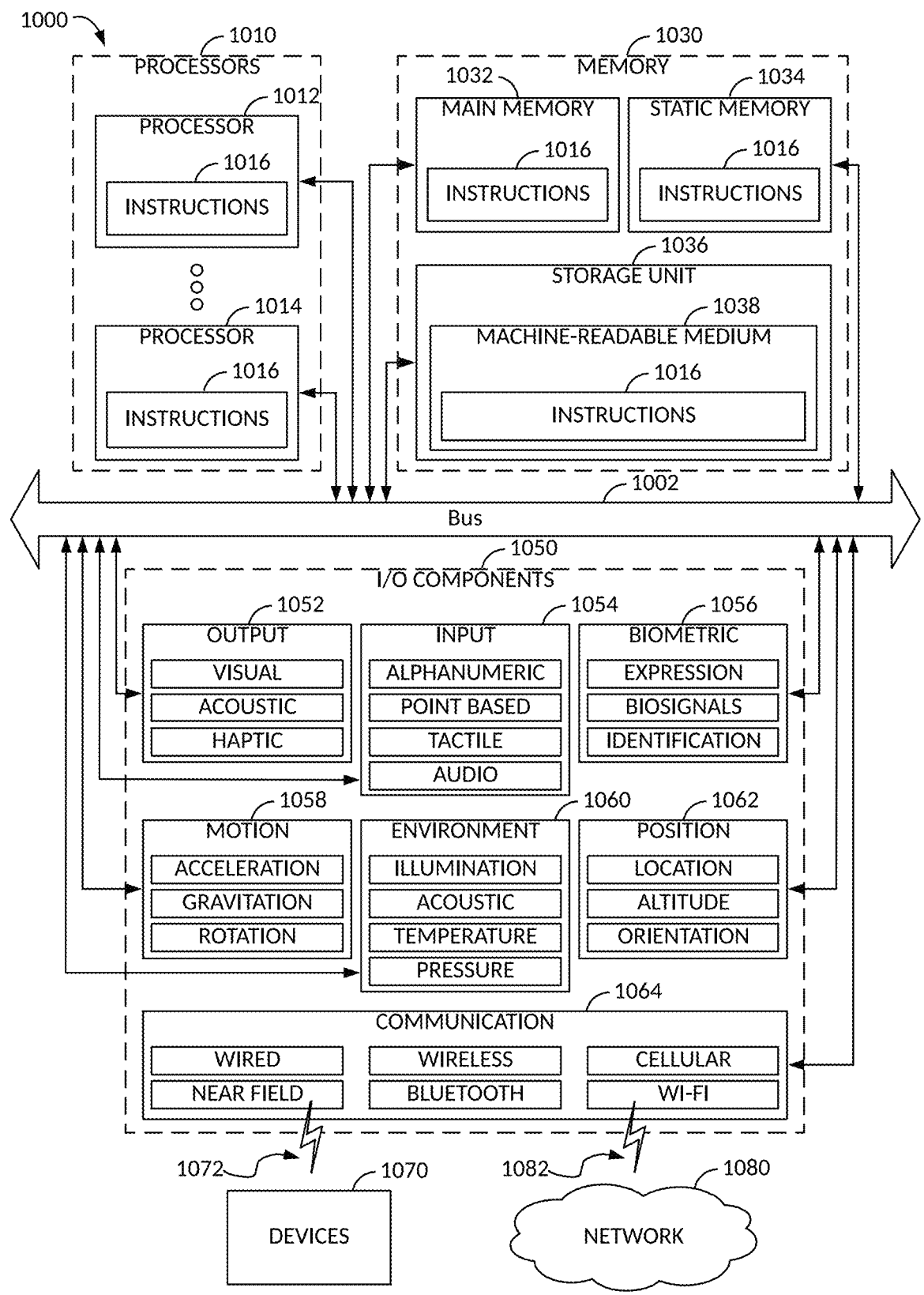
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an apples, an app, or other executable code) for causing the machine 1000 to perform any one or more of the methodologies discussed herein may be executed. For example, the instructions 1016 may cause the machine 1000 to execute the methods 500, 600, and 700 of FIGS. 5, 6, and 7. Additionally, or alternatively, the instructions 1016 may implement FIGS. 1, 2, 3, 4A, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10, The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A server comprising:
a storage device comprising a database of items and corresponding attributes data;
a hardware processor configured to perform operations comprising:
receiving, from a querying computing device, an initial query that identifies a first item listed by a first user account and an initial query value for the first item;
providing the initial query to a first computing device associated with the first user account;
receiving a first response to the initial query from the first computing device, the first response indicating a rejection of the initial query value;
in response to the rejection, identifying a second item listed by a second user account, the second item including a shared attribute with the first item;
in response to the rejection, substituting the initial query with a replacement query that identifies the second item and the initial query value for the first item;
identifying a second computing device associated with the second user account;
in response to the rejection, automatically providing the replacement query to the second computing device associated with the second user account without receiving the replacement query from the querying computing device;
providing an option for the replacement query to the querying computing device prior to receiving the initial query from the querying computing device, wherein the initial query indicates a selection of the option for the replacement query;
generating, at the server, a first graphical user interface comprising a first graphical element representing the option for the replacement query;
providing the first graphical user interface to the querying computing device; and
generating, at the server, a second graphical user interface indicating a second response from the replacement query to the second computing device, without generating a third graphical user interface to the querying computing device, the third graphical user interface being configured to provide another query for the first item to the second computing device.

2. The server of claim 1, wherein the operations further comprise:
receiving, from the second computing device, a second response, the second response indicating an acceptance of the initial query value;
providing the second response to the first computing device; and
receiving a confirmation of the second response from the first computing device.

3. The server of claim 1, wherein the operations further comprise:
identifying, in a listing application, a plurality of listings that indicate the first item as available, each listing originated by one or more user accounts of the listing application; and
providing the replacement query to the one or more user accounts that identifies the first item as available in their corresponding listing, the replacement query identifying the first item and the initial query value for the first item.

4. The server of claim 1, wherein the operations further comprise:
identifying, in a listing application, a first plurality of listings that indicate the first item as available, each listing originated by one or more user accounts;
identifying a second plurality of listings from the first plurality of listings based on a replacement attribute; and
providing the replacement query to the one or more user accounts from the second plurality of listings.

5. The server of claim 4, wherein the replacement attribute includes one of a user account ranking and a geographic location.

6. The server of claim 1, wherein the first and second items are the same.

7. The server of claim 1, wherein the shared attribute includes an attribute value within a predefined attribute value range.

8. The server of claim 7, wherein the predefined attribute value range includes a geographic range.

9. A computer-implemented method comprising:
receiving, from a querying computing device, an initial query that identifies a first item listed by a first user account and an initial query value for the first item;
providing the initial query to a first computing device associated with the first user account;
receiving a first response to the initial query from the first computing device, the first response indicating a rejection of the initial query value;
in response to the rejection, identifying a second item listed by a second user account, the second item including a shared attribute with the first item;
in response to the rejection, substituting the initial query with a replacement query that identifies the second item and the initial query value for the first item;
identifying a second computing device associated with the second user account in response to the rejection automatically providing the replacement query to the second computing device associated with the second user account without receiving the replacement, query from the querying computing device;
providing an option for the replacement query to the querying computing device prior to receiving the initial query from the querying computing device, wherein the initial query indicates a selection of the option for the replacement query;
generating, at the server, a first graphical user interface comprising a first graphical element representing the option for the replacement query;
providing the first graphical user interface to the querying computing device; and
generating, at the server, a second graphical user interface indicating a second response from the replacement query to the second computing device, without generating a third graphical user interface to the querying computing device, the third graphical user interface being configured to provide another query for the first item to the second computing device.

10. The computer-implemented method of claim 9; further comprising:

receiving, from the second computing device, a second response, the second response indicating an acceptance of the initial query value;

providing the second response to the first computing device; and receiving a confirmation of the second response from the first computing device.

11. The computer-implemented method of claim 9, further comprising:

identifying, in a listing application, a plurality of listings that indicate the first item as available, each listing originated by one or more user accounts of the listing application; and providing the replacement query to the one or more user accounts that identifies the first item as available in their corresponding listing, the replacement query identifying the first item and the initial query value for the first item.

12. The computer-implemented method of claim 9, further comprising:

identifying, in a listing application, a first plurality of listings that indicate the first item as available, each listing originated by one or more user accounts;

identifying a second plurality of listings from the first plurality of listings based on a replacement attribute; and providing the replacement query to the one or more user accounts from the second plurality of listings.

13. The computer-implemented method of claim 12, wherein the replacement attribute includes one of a user account ranking and a geographic location.

14. The computer-implemented method of claim 9, wherein the first and second items are the same.

15. The computer-implemented method server of claim 9, wherein the shared attribute includes an attribute value within a predefined attribute value range.

16. A non-transitory computer-readable storage medium comprising instructions that, when executed by at least one processor of a machine; cause the machine to perform operations comprising:

receiving, at the server, an initial query that identifies a first item listed by a first user account and an initial query value for the first item;

providing the initial query to a first computing device associated with the first user account;

receiving a first response to the initial query from the first computing device, the first response indicating a rejection of the initial query value;

in response to the rejection, identifying a second item listed by a second user account; the second item including a shared attribute with the first item;

in response to the rejection, substituting the initial query with a replacement query that identifies the second item and the initial query value for the first item;

identifying a second computing device associated with the second user account;

in response to the rejection, automatically providing the replacement query to the second computing device associated with the second user account without receiving the replacement query from the querying computing device;

providing an option for the replacement query to the querying computing device prior to receiving the initial query from the querying computing device, wherein the initial query indicates a selection of the option for the replacement query;

generating, at the server, a first graphical user interface comprising a first graphical element resenting the option for the replacement query;

providing the first graphical user interface to the querying computing device; and generating, at the server, a second graphical user interface indicating a second response from the replacement query to the second computing device, without generating a third graphical user interface to the querying computing device, the third graphical user interface being configured to provide another query for the first item to the second computing device.

* * * * *